July 17, 1951    J. W. SHERRILL ET AL    2,561,074
FLASHLIGHT OIL TESTER
Filed Aug. 27, 1947
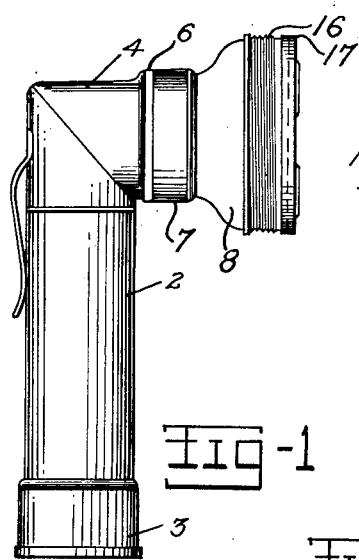
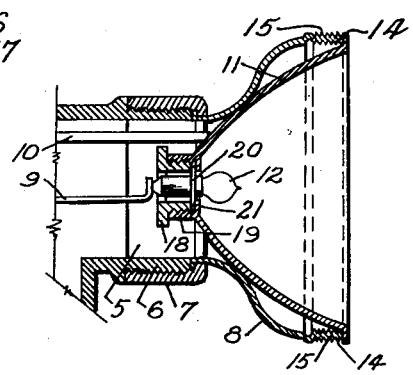
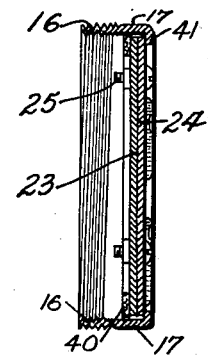
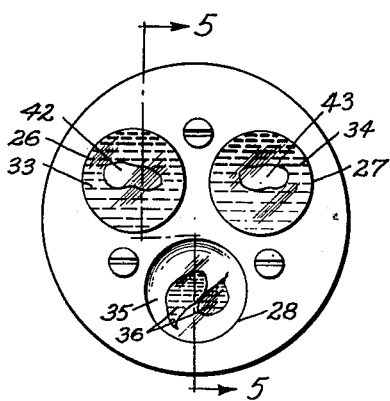
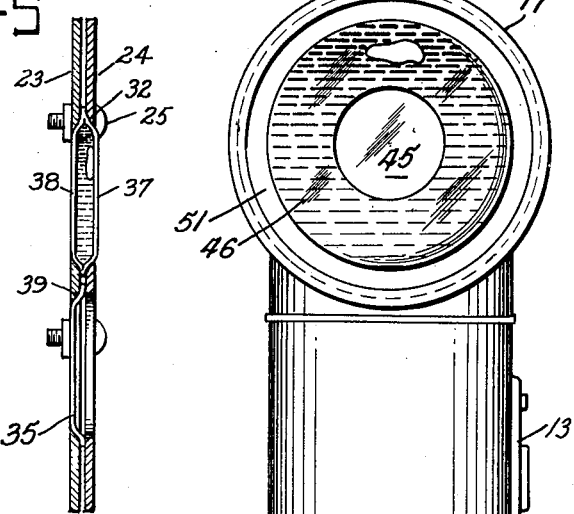
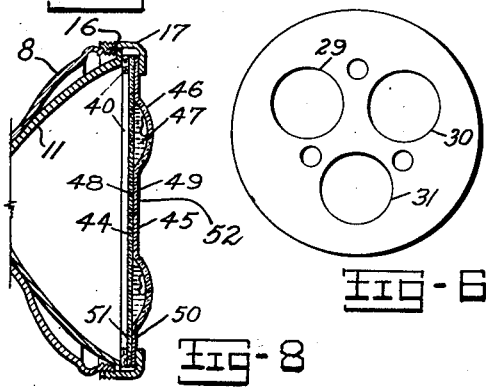
INVENTORS;
J. W. SHERRILL
L. G. ALEXANDER
By: Shoemaker & Mattare
ATTORNEYS Patented July 17, 1951

2,561,074

UNITED STATES PATENT OFFICE 2,561,074

FLASHLIGHT OIL TESTER

James W. Sherrill, Belmont, and Leon G. Alexander, Steel Creek, N. C., assignors to Wix Accessories Corporation, Gastonia, N. C., a corporation of North Carolina Application August 27, 1947, Serial No. 770,776

4 Claims. (Cl. 88—14)

1

The invention relates to a flashlight oil tester for testing and comparing fluids such as oil and the like and provides an illuminated fluid testing means for visually inspecting oil and like fluids for viscosity, fluidity and pollution.

In the operation of internal combustion engines and general lubrication of machinery, the purity and color, fluidity and viscosity of the oil particularly after use for a time, and while it is still in the motor of the machine, are of importance.

An object of the present invention is to provide a simple, practical and comparatively inexpensive unit adapted to be readily substituted for the plain glass lens of a flashlight, such as a regular "Boy Scout Army Type Model Flashlight," and capable of enabling a quick visual checking of the clarity of used crank case oil by service station attendants and others and a simultaneous comparison of a sample of such used oil with clean unused oil while both the sample of used oil and the clean unused oil are illuminated by a regular flashlight battery bulb.

A further object of the invention is to provide, for use with an ordinary or standard flashlight, a unit which may be easily and quickly applied to the same and which may be equipped with one or more chambers or receptacles for holding a plurality of types of oil or other liquids and which is also equipped with a plane transparent lens or window adapted to serve as a spotlight for use of an attendant or others at night as well as forming a dish or receptacle for holding a sample of dirty or used oil obtained from the crank case of an internal combustion engine of an automobile or other automotive vehicle obtained from such crank case by the ordinary oil level dip stick with which such internal combustion engines are usually equipped.

It is also an object of the invention to provide a flashlight receiving unit forming an opaque end wall for the front or outer end of the flashlight and adapted to be lithographed with advertising matter for advertising various articles or commodities, said advertising matter being arranged around or between or adjacent to a liquid transparent container or containers for oils or other liquids and a plain window or lens which is used as a spotlight when the device is not employed for testing oil or other liquids, so that an attendant in searching for the oil level dip stick of an engine will not accidentally come in contact with a hot portion of the same and burn his hands.

It is also an object of the invention to enable the unit forming the subject matter of the present invention to be readily applied to an ordinary standard flashlight so that the latter may be easily serviced by practically any service station in the country for renewal of batteries, bulbs or even switch and body.

It is also an object of the invention to provide

2 a transparent unit equipped with an annular cavity divided into one or more compartments or chambers for reception of an oil or different types of oils or other liquids surrounding a central transparent spotlight portion and providing an exterior wall for such spotlight portion and forming an exterior cavity for the reception of a sample of used crank case oil for comparison with clean unused oil or oils in the chambers or compartments while the same and the central flashlight portion, having the sample of used oil, are simultaneously illuminated by the incandescent light bulb of the flashlight.

It is also an object of the invention to provide a flashlight oil tester which, in testing a sample of used oil from the crank case of an internal combustion engine, will easily show the clarity of the oil as well as the larger particles of impurities in the sample of dirty or used oil which has been dropped onto the flashlight lens or window and afford an immediate comparison of said sample with the clean unused oil contained in a transparent receptacle carried by the oil tester and illuminated by the flashlight bulb simultaneously with illumination of said sample.

With the above and other objects in view, the invention consists in the construction and novel combination and arrangement of parts hereinafter fully described, illustrated in the accompanying drawings and pointed out in the claims hereto appended, it being understood that various changes in the form, proportions, and minor details of construction, within the scope of the claims, may be resorted to without departing from the spirit or sacrificing any of the advantages of the invention.

In the drawings:

Fig. 1 is a side elevation of a flashlight provided with an oil testing unit constructed in accordance with this invention;

Fig. 2 is an enlarged sectional view of the outer portion of the same;

Fig. 3 is a similar view of the outer end cap and the oil testing unit;

Fig. 4 is a plan view of the oil testing unit;

Fig. 5 is an enlarged transverse sectional view of the oil tester unit taken on the line 5—5 of Fig. 4;

Fig. 6 is a plan view of the inner disk of the oil testing unit;

Fig. 7 is an elevation of a flashlight equipped with a transparent unit illustrating a modification of the invention, the inner end cap of the tubular body being removed for convenience of illustration;

Fig. 8 is a transverse sectional view illustrating the manner of mounting the transparent unit.

Referring particularly to Figs. 1 to 5 inclusive of the accompanying drawing, in which there is illustrated one form of the invention, the oil tester unit, which is shown applied to a flashlight of a regular "Boy Scout" model, comprises a tubular body 2 provided at its inner end with a removable threaded cap 3 and having a closed outer end 4 and provided at one side of the same with a circular opening 5 and having an exteriorly threaded annular flange 6 surrounding the same and threadedly engaged by an interiorly threaded inner cylindrical portion 7 which connects an outer tapered shell 8 of substantially funnel shape formation with the tubular body 2.

The standard "Boy Scout Army Type" model of flashlight is of the usual construction and the tubular body contains the ordinary dry batteries (not shown) which are in electric circuit with conductors 9 and 10 contacting respectively with a metallic reflector 11 and with the central terminal of a flashlight bulb 12 so that when the circuit is closed by switch 13 the incandescent flashlight bulb 12 will be lighted in the usual manner.

The tubular body and the cylindrical sleeve or portion 7 may be made of plastic or any other suitable material and the tapered outer shell 8 is preferably of thin sheet metal which is provided with an outer cylindrical portion 14 stamped to form exterior screw threads 15 for the reception of an interiorly threaded cylindrical portion 16 of an outer cap 17 in which the oil tester unit is mounted whereby the unit may be readily connected with a standard flashlight and may be easily and quickly removed therefrom.

The reflector 11, which is preferably constructed of suitable metal, is of substantially parabolic formation and has an inner side reflecting light formed by enameling, painting or otherwise coating the inner face of the reflector to increase the diffusion of light from the electric light bulb. The electric light bulb is mounted within an exteriorly threaded sleeve 18 of any suitable insulating material threaded into an interiorly threaded socket 19 at the inner end of the reflector. The electric light bulb is provided with a flange 20 which is clamped by the sleeve 18 against the wall 21 of the socket. The wall is provided with a central opening through which the electric light bulb passes and the sleeve is provided at its rear end with a flange 22 preferably milled to enable it to be readily rotated for screwing it into and out of the socket of the reflector to enable the electric light bulb to be readily changed when necessary.

The oil tester unit illustrated in Figs. 1 to 6 inclusive of the drawings comprises in its construction inner and outer opaque plates 23 and 24 constructed preferably of metal or the like but any other suitable material may, of course, be employed in the construction of the inner and outer opaque plates 23 and 24 which are connected by bolts 25 passing through registering perforations in the inner and outer plates but any other suitable means may, of course, be used for connecting said plates. The outer or front plate 24 is provided with three circular openings 26, 27 and 28 and the inner or rear plate is provided with similar openings 29, 30 and 31 which register with the openings 26, 27 and 28 of the outer plate.

The edges of the inner and outer plates 23 and 24, at the peripheries of said openings, diverge at their inner opposed faces to provide annular grooves 32 adapted to receive transparent containers 33 and 34 and a plain transparent disk or plate 35 which is preferably dished at the front or outer face to present an exterior concavity or depression which when held in a horizontal position facing upwardly forms a dish to receive several drops 36 of used or crank case oil to enable such sample to be compared with clean unused oil contained in the receptacles 33 and 34. The plain transparent disk constitutes a combined spotlight and sample receiving area which is adapted to be illuminated simultaneously with the containers 33 and 34 by the bulb of the flashlight to permit comparison of a sample of used or crank-case oil with the clean oil and after comparison the said area may be wiped off and conditioned for another test.

The receptacles 33 and 34 which may, of course, be employed for containing any other liquid to enable a comparison of a sample other than used crank case oil with the contents of the said receptacles 33 and 34, are each composed preferably of two transparent substantially concavo convex disks 37 and 38 connected or secured together at their peripheries by suitable cement but any other suitable means may be employed for connecting the peripheries of the concavo convex disks and the latter may also be made of any other suitable transparent material such as glass.

The plain dished disk or plate 35 is secured at its periphery in a groove 39 formed by the edges of the inner and outer plates at the opening 28 as clearly illustrated in Fig. 5 of the drawings. When the opaque plates are secured together by the bolts 25, the receptacles 33 and 34 and the disk or plate 35 are securely held in the grooves formed by the inner and outer plates at the peripheries of their circular openings and the detachable connection between the inner and outer plates enables the plates to be readily removed for changing the grade or type of oil contained within them which may be done by changing the oil within the receptacles or substituting other receptacles for the same having the desired grade or types of oils.

The "Boy Scout" model of flashlight is adapted to be held in the hand with the oil tester unit in a horizontal position for receiving several drops of crank case oil which may be conveniently deposited on the lens by the ordinary oil level dip stick with which engines of automobiles and other automotive vehicles are usually equipped.

When the flashlight switch is operated to close the circuit of the flashlight, the containers or receptacles 33 and 34 and the disk or plate 35 will be simultaneously illuminated so that a quick check-up and comparison of the used oil of a crank case with clean unused oil contained within the receptacles may be made. Also, the inner plates of the containers 33 and 34 and the inner face of the lens may be frosted to diffuse the light more uniformly for an easy comparison of a sample of used or crank case oil with the clean oil contained within the receptacle. Also, the plain disk or plate 35 forming the spotlight is found convenient in locating the oil level dip stick of a motor and for various other purposes.

After a comparison of a sample of used or crank case oil with the clean unused oil contained in the receptacles 33 and 34 has been made, the disk or plate may be wiped off and the device is in condition for another test.

The oil tester unit is secured within the flashlight head by packing ring 40 of leather or any other suitable material which frictionally engages the interior of the outer cap 17 and which is adapted to hold the oil tester unit firmly in engagement with an inwardly extending annular flange 41 of the outer cap 17 and an out-turned flange of the reflector 11 which provides a supporting ledge for the oil tester unit and which is seated upon the outer shell 8 but any other suitable means may be employed for retaining the oil tester unit within the cap 17 which is readily removable from the shell 8 to afford access to the oil tester unit. Bubbles 42 and 43 are shown in the liquid contained in the receptacles 33 and 34.

In Figs. 7 and 8 of the drawings, is illustrated another form of the oil tester unit comprising a flat inner transparent disk 44 of plastic material and an outer transparent disk 45 of plastic material provided with an annular bulged or half-doughnut formation 46 forming an annular recess for the reception of clean unused oil 47 or other liquid. The disks 44 and 45 may be constructed of any other suitable material and they are suitably secured together by cement or other means. The central portions 48 and 49 of the disks form a spotlight portion and the annular semi-doughnut formation surrounding the central portion provides a wall around the central flashlight portions and provides a recess 52 for the reception of a sample of used oil so that it may be compared with clean unused oil contained within the annular receptacle. The annular receptacle, may, if desired, be divided into several compartments so that a plurality of clean unused oils or other liquids may be contained within the tester unit. The outer portions 50 and 51 of the inner and outer disks 44 and 45 are preferably opaque but this is not necessary as the illumination from the flashlight bulb will enable the desired check-up and comparison of used or crank case oil with clean oil contained in the transparent receptacle to be made.

The oil tester unit illustrated in Figs. 7 and 8 is retained in the outer cap 17 of a flashlight by packing ring 40 and as the construction of the "Boy Scout" model flashlight illustrated in Figs. 7 and 8, is the same as that heretofore described, further description and illustration thereof are deemed unnecessary.

When the operator attendant of a filling station or the like withdraws the oil level dip stick from the engine, a few drops of the oil on the dip stick is placed on the spotlight lens and the flashlight switch is closed, thereby producing a light behind the oil tester unit. In this way, it is very easy to show the clarity of the oil as well as showing up the larger particles of impurity in the dirty oil which has been dropped on the flashlight lens and an immediate comparison with the clean unused oil is obtained. As soon as the device has served its purpose, the attendant cleans off the flashlight lens or disk with any cloth or wiping rag and the device is ready for future use.

The outer plate of the flashlight unit may be advantageously employed for displaying advertising matter and the metallic outer plate of the form of the invention illustrated in Figs. 1 to 6 inclusive lends itself admirably to lithographing. The advertising matter on the oil tester unit may be employed for stimulating the sale of various commodities.

What is claimed is:

1. An oil tester unit for a flashlight comprising inner and outer opaque plates provided with a plurality of registering circular openings, the edges of the inner and outer plates at the openings forming annular grooves, a plurality of transparent oil receptacles mounted between said plates in said grooves and adapted to contain clean unused oil, and a plain transparent disk mounted in another of said annular grooves and dished to form an open exterior receptacle adapted when arranged in a horizontal position to receive a sample of crank case oil, means for mounting the oil tester unit on a flashlight in front of the bulb thereof whereby said disk and the transparent receptacles may be simultaneously illuminated by the flashlight bulb.

2. An oil tester unit designed to be mounted on a flashlight in front of the bulb thereof comprising inner and outer opaque plates provided with a plurality of registering circular openings, the edges of the inner and outer plates at the openings forming annular grooves, a plurality of transparent oil receptacles mounted between said plates in said grooves and adapted to contain clean unused oil, and a plain transparent disk mounted in another of said annular grooves dished to form an open exterior receptacle, whereby the same and the transparent receptacles may be simultaneously illuminated by the flashlight bulb, said disk being exteriorly dished for holding drops of used or crank case oil when said disk is arranged in a horizontal position.

3. An oil tester unit for a flashlight consisting of an opaque wall composed of inner and outer plates having registering openings, a transparent oil receptacle mounted between said plates at a pair of registering openings thereof, and a transparent disk secured between said plates at another pair of openings thereof and adapted when held in a horizontal position to receive a sample, a few drops, of crank case oil, and means for mounting the oil tester unit on a flashlight in front of the bulb thereof whereby the plate and the receptacle containing clean unused oil may be simultaneously illuminated by the flashlight bulb.

4. An oil tester unit designed to be mounted on a flashlight in front of the bulb thereof comprising inner and outer opaque plates provided with a plurality of registering circular openings, the edges of the inner and outer plates at the openings forming annular grooves, a plurality of transparent oil receptacles mounted between said plates in said grooves and adapted to contain clean unused oil, and a plain transparent disk mounted in another of said annular grooves and when held in a horizontal position adapted to receive a sample, a few drops, of crank case oil whereby the same and the transparent receptacles may be simultaneously illuminated by the flashlight bulb, said receptacles consisting each of a pair of disks united at their peripheries.

JAMES W. SHERRILL.
LEON G. ALEXANDER.

REFERENCES CITED

The following references are of record in the file of this patent:

UNITED STATES PATENTS

| Number | Name | Date |
| --- | --- | --- |
| 1,994,102 | Holt | Mar. 12, 1935 |
| 2,016,819 | Meginniss | Oct. 8, 1935 |
| 2,027,130 | Towne | Jan. 7, 1936 |
| 2,062,929 | Powers | Dec. 1, 1936 |
| 2,133,544 | Kolb | Oct. 18, 1938 |

FOREIGN PATENTS

| Number | Country | Date |
| --- | --- | --- |
| 219,710 | Great Britain | June 4, 1925 |